Dec. 7, 1965 S. W. SMALL ETAL 3,222,500
WATER STORING AND HEATING APPARATUS IN DEVICES FOR
BREWING AND DISPENSING BEVERAGES
Original Filed July 14, 1961 3 Sheets-Sheet 3
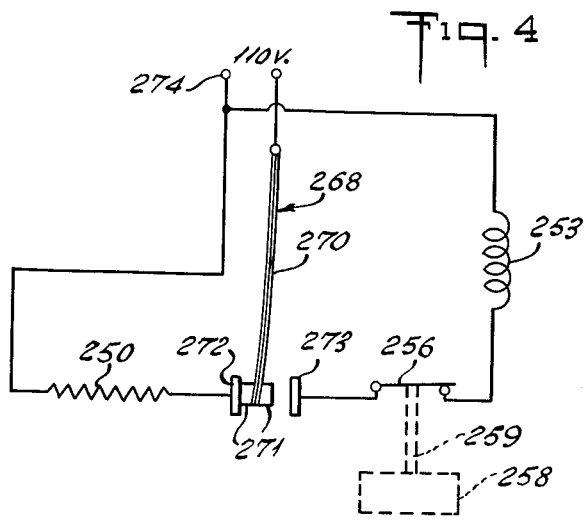
INVENTORS
SOLLIE W. SMALL
DAVID HERMAN
BY William R. Liberman
ATTORNEY

United States Patent Office 3,222,500
Patented Dec. 7, 1965

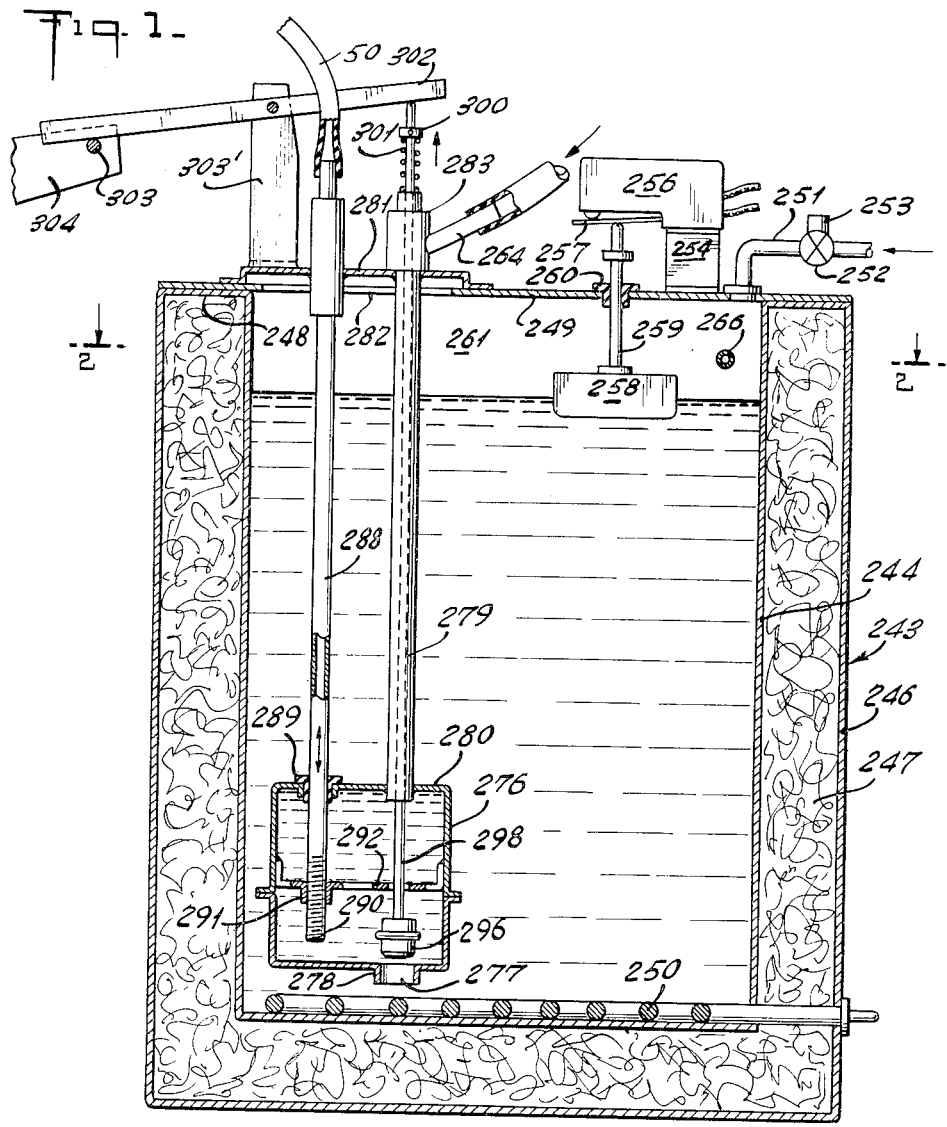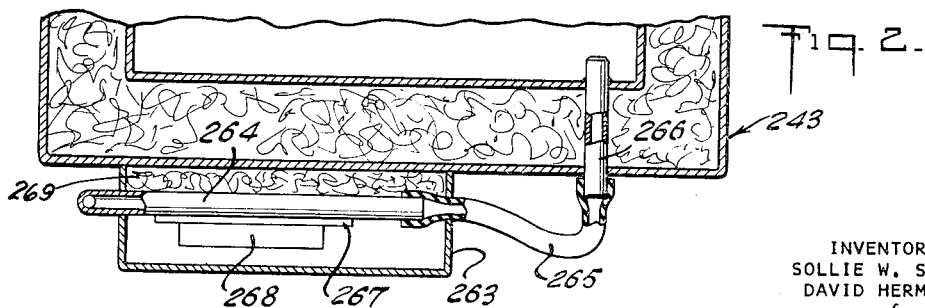

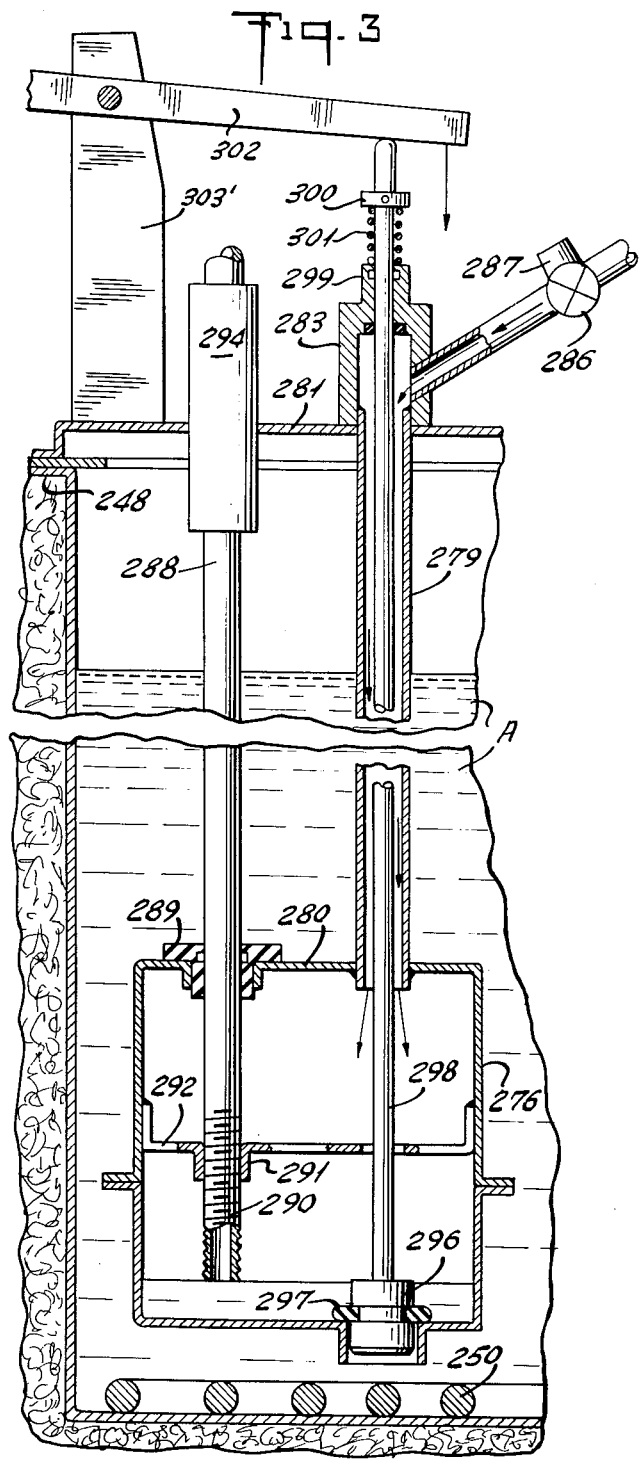

3,222,500
WATER STORING AND HEATING APPARATUS IN DEVICES FOR BREWING AND DISPENSING BEVERAGES
Sollie W. Small and David Herman, Newark, N.J., assignors to Coffee-Mat Corporation, Elizabeth, N.J., a corporation of New Jersey
Original application July 14, 1961, Ser. No. 124,207. Divided and this application July 29, 1964, Ser. No. 389,239
5 Claims. (Cl. 219—328)

This is a division of application Serial No. 124,207, filed July 14, 1961, now abandoned.

The present invention relates generally to improvements in apparatus for the production of beverages, but it relates in particular to an improved apparatus for the brewing and dispensing of coffee beverage in unit quantities.

In the conventional hot coffee vending and dispensing machines, the coffee flavor is generally stored in the vending machine as a liquid coffee flavor concentrate or extract. Upon coin actuation of the vending machine, measured quantities of the coffee flavor and hot water are admixed as well as a sweetening material, also cream if preselected, and the resulting beverage is discharged into and dispensed in a cup. While the coffee vending machines heretofore employed and proposed operate satisfactorily from a mechanical point of view they leave much to be desired insofar as the quality of the end product is concerned. Not only is the flavor of the dispensed coffee generally inferior but it deteriorates with time and is non-uniform from cup to cup. This is in part an inevitable consequence of the use of coffee extracts and concentrates in preparing the beverage instead of freshly brewing the coffee from the coffee grounds. Another contributing fact to the inferior quality of the conventional machine vended coffee is the wide variation in the temperature of the beverage water which adversely affects the end product. While automatic coffee brewing and dispensing mechanisms have been proposed, these have been complex and costly, the prepared beverage has been expensive, and the machines possessed numerous drawbacks and disadvantages as is evidenced by the fact that they are not in commercial use to any appreciable extent.

It is, therefore, a principal object of the present invention to provide an improved apparatus for producing beverages.

Another object of the present invention is to provide an improved coffee beverage vending and dispensing apparatus.

Still another object of the present invention is to provide an improved water heating and storing apparatus.

A further object of the present invention is to provide a brewing apparatus of the above nature characterized by its ruggedness, simplicity, reliability of operation, flexibility, and high quality of the end product.

The above and other objects of the present invention will become apparent from a reading of the following description taken in conjunction with the accompanying drawings, wherein:

FIGURE 1 is a vertical sectional view of the hot water tank and water feed mechanism;

FIGURE 2 is a fragmentary sectional view taken along line 27—27 in FIGURE 1;

FIGURE 3 is an enlarged fragmentary view similar to FIGURE 1 showing, however, the mechanism in a water discharge position; and FIGURE 4 is a schematic view of the water tank filling and heating circuit.

A feature of the present invention resides in the water dispensing device which comprises a water reservoir, a metering vessel immersed in said reservoir and having an inlet port formed therein communicating with said reservoir, an outlet conduit communicating with said vessel, a valve associated with said inlet port and movable between an open and closed position, means adapted to discharge the liquid from said vessel through said outlet conduit, and means alternately closing said port valve and actuating said discharge means, and deactivating said discharge means and opening said port valve. The discharge means is defined by a valved source of compressed air connected by an air conduit to the metering vessel, the outlet conduit extending into the metering vessel below the level of the air conduit. Water is delivered to the reservoir only when the level thereof falls below a predetermined point and the reservoir water exceeds a predetermined temperature.

Other features of the present invention will become apparent from the detailed description of the embodiment thereof as hereinafter set forth.

The water heating and metering arrangement according to the present invention comprises a tank assembly 243 insulated on its four sides and bottom and uninsulated at its top and including an inner shell 244 nesting in an outer shell 246, and separated therefrom by a filler 247 of suitable heat insulating material, the upper edges of the outer shell 246 being provided with a peripheral rim 248. Resting atop the shell 244 is an uninsulated metal closure lid 249 which serves the additional purpose of condensing steam which evolves from the water A disposed in tank 243. An electric resistance heater element 250 of the clad type rests on the bottom of inner shell 244 and is provided with electrical leads extending through the tank walls. A water feed pipe 251 communicates with the interior of tank 243 by way of an opening in lid 249, and is connected to a source of water by means of a normally closed valve 252 actuated by a solenoid 253.

Mounted on lid 249 by means of a bracket 254 and disposed above the level of the lid is a normally closed switch 256 provided on its underface with an actuating arm 257, the raising of which effects the opening of switch 256. A float member 258 is located in tank 243 and is raised and lowered in accordance with the level of the water A. The float 258 carries an upright actuating rod 259 which projects through a bushing 260 in lid 249 and when in raised position bears against switch arm 257 to actuate switch 256. Switch 256 is so located that it is actuated to its open position when the level of the water A reaches a height which allows for a vapor space 261 between lid 249 and the top level of water W.

A small housing 263 is supported atop the side wall of the tank outer shell 246, and encloses a metal steam tube 264 having an open outlet disposed outside housing 263 and an inlet connected to the vapor zone 261 by way of a hose 265 and a tube 266 projecting through the wall of tank 243. A metal plate 267 is affixed, in good heat transfer relation, to metal tube 264 and carries a double throw bimetal thermostatic switch 268. In housing 263, the space between steam tube 264 and outer jacket 246 is filled with a heat insulating filler 269. The space in front of the thermostat is clear, permitting the passage of air.

As seen in FIGURE 4 of the drawing, thermostatic switch 268 includes a bimetal arm 270 carrying contacts 271 at its lower end which alternately engage contact elements 272 or 273, the element 273 being engaged when the bimetal arm 270 is above a predetermined temperature about or slightly less than that of boiling water and the contact 272 being engaged at a somewhat lower temperature. Contact element 272 is connected to one terminal of resistance heater 250, the other terminal of which is connected to a first pole 274 of a source of electric current, the other pole being connected to switch arm 270. Contact element 273 is also connected to the current source first pole 274 by way of series connected switch 256 and water supply valve actuating solenoid 253.

By reason of the above water heating arrangement, a supply of hot water at a substantially constant temperature is always available substantially independent of the rate of discharge. In the event that the temperature of the water A is somewhat below the boiling point thereof, the power circuit to heater 250 is completed to energize the heater since the bimetal arm has cooled sufficiently to effect its engagement with contact element 272. Concurrently, contact element 273 is disengaged thereby to prevent the delivery of water to tank 243 since the valve solenoid cannot be energized. Upon water A being heated to its boiling point, bimetal arm 270 is heated by the steam condensing in or passing through tube 264 to switch said arm 270 out of engagement with contact element 272, deenergizing heater 250, and into contact with contact element 273. In the event that the level of the water A is low, switch 256 is permitted to close by lowered float 258, and the valve solenoid energized to open valve 252 until sufficient water is introduced into the tank to raise the level thereof and consequently float 258 to a position opening switch 256 and deenergizing solenoid 253 to close valve 252. It is apparent that since cold feed water can be delivered to tank 243 only when the water therein is at about its boiling point there is a very narrow range in fluctuation of the water temperature.

The brew water metering system includes a water metering vessel 276 located in tank 243 a short distance above the bottom thereof and having a downwardly directed inlet port 277 formed in its bottom wall and provided with a depending peripheral lip 278. The metering vessel 276 is supported by a vertical tube 279 whose lower end enters vessel 276 through and in liquid tight relationship with an opening formed in the vessel top wall 280, and is affixed to wall 280. Tube 279 depends from a flat topped cap 281 overlying and closing an opening 282 formed in tank lid 249, and is affixed to the cap and registers with on opening therein. Mounted atop cap 281 and communicating with tube 279 is a hollow cylindrical coupling member 283 having a laterally upwardly extending connecting tube 264 communicating, by way of a three way valve 286, alternately to a source of compressed air or to the atmosphere. Valve 286 normally connects tube 279 to the atmosphere by way of coupling member 283 and tube 284 and is actuated by a solenoid 287, the energization of which effects the connection of tube 279 to the source of compressed air.

A vertical outlet tube 288 slidably projects into vessel 276 through top wall 280 by way of a water tight bushing 289, the lower end of the tube 288 being externally threaded as at 290 and engaging a tapped collar 291 carried by a bracket 292 secured to and extending across the vessel 276 substantially at its midpoint. The level of the bottom of outlet tube 290 is below that of inlet tube 279, and is vertically adjustable by rotating the outlet tube 290 thereby to vary the unit quantity of metered water. The upper section of outlet tube 288 passes through and slidably and rotatably registers with a bushing 294 mounted on cap 281. Outlet tube 288 is connected by way of flexible hose 50 to an associated apparatus.

Associated with vessel inlet port 277 is a closure valve member 296 of cylindrical configuration provided with a rubber ring 297 which engages a peripheral groove formed in member 296. Valve member 296 is mounted on the lower end of a valve stem or rod 298, and is movable thereby between a lower port closing position, as illustrated in FIGURE 28, and a raised port open position, as illustrated in FIGURE 26. Valve rod 298 is of smaller diameter than the inner diameter of tube 279, and extends coaxially through tube 279 and slidably projects through a sleeve 299 mounted atop coupling member 283. An annular stop member 300 is affixed to the upper part of valve rod 298, and a helical compression spring 301 is entrapped between the stop member 300 and sleeve 299 normally to urge valve rod 298 to its raised position and valve member 296 to its open position.

The valve rod actuating mechanism includes a lever 302 pivoted between its ends to an upright bracket 303' mounted on cap 281. One end of lever 302 bears upon the upper end of valve rod 298, and the opposite end of lever 302 bears against an underlying rod 303. This rod 303 is supported by and between the leading upper corners of a pair of parallel bracket plates 304, the trailing edges of which are connected by a cross plate.

While there has been described and illustrated a preferred embodiment of the present invention, it is apparent that numerous alterations, omissions and additions may be made without departing from the spirit thereof.

What is claimed is:

1. A water storing and heating apparatus comprising a tank containing water, means for discharging water from said tank, means for heating the water in said tank, means including a valve connecting said tank to a source of water, a first electric switch means responsive to the water level in said tank and alternatively movable between states corresponding to a valve open and a valve closed position, second electric switch means responsive to the tank water temperature and movable alternatively to states corresponding to a heater energizing position when said water is below a predetermined temperature and to a valve open position when said water temperature is above a predetermined temperature, and means for opening said valve only when said first and second switches are in states corresponding to their valve open position.

2. An apparatus for storing, heating and regulating the temperature of water at substantially the boiling point thereof at atmospheric pressure comprising a tank having a top and containing water, means for supplying to and maintaining the water in said tank at a predetermined level below said top thereof to provide a vapor zone adjacent said top of said tank, a metal tube disposed outside the interior of said tank and communicating with the atmosphere and with said vapor zone at a point above said water predetermined level and heat conduction-insulated from the interior of said tank, means including a heating element for heating the water in said tank, and means including a thermostatic switch in operative relation to said heating unit, said thermostatic switch including a thermostatic element mounted in heat transfer relationship with said metal tube at a position external to said tube and said tank and actuatable between an open and closed position at a temperature not exceeding 100° C. for de-energizing said heating element only upon the boiling of said water in said tank.

3. The apparatus of claim 1, wherein said thermostatic switch is exposed to the ambient atmosphere.

4. The apparatus of claim 1, including a heat insulated enclosure housing a section of said metal tube.

5. A hot water supply system comprising a storage tank containing water, means for supplying water to said tank, means including an electrical heating unit for heating the water in said tank, a pipe communicating with the upper part of said tank and with the atmosphere and extending to a point above the water level in said tank, a thermostatic switch in operative relation to said heating unit, said thermostatic switch including a thermostatic element in heat transfer relationship with a wall of said pipe and positioned external to said tank and said pipe, said thermostatic element being responsive to a temperature not exceeding 100° C. to actuate said switch, and means responsive to said switch for deenergizing said heating element only upon the boiling of said water in said tank.

References Cited by the Examiner
UNITED STATES PATENTS

| | | | |
|---|---|---|---|
| 1,095,517 | 5/1914 | Parshall | 165—135 X |
| 1,142,420 | 6/1915 | Harrison | 122—448 |
| 1,549,033 | 8/1925 | Still | 122—448 |
| 2,291,118 | 7/1942 | Thomas | 122—448 |
| 2,393,313 | 1/1946 | Doble | 12—488 X |
| 3,060,905 | 10/1962 | Cunningham et al. | 122—448 |

ROBERT A. O'LEARY, *Primary Examiner.*

CHARLES SUKALO, FREDERICK L. MATTESON, JR., *Examiners.*

M. A. ANTONAKAS, *Assistant Examiner.*

Disclaimer 3,222,500.—*Sollie W. Small* and *David Herman*, Newark, N.J. WATER STORING AND HEATING APPARATUS IN DEVICES FOR BREWING AND DISPENSING BEVERAGES. Patent dated Dec. 7, 1965. Disclaimer filed Aug. 11, 1969, by the assignee, *Coffee-Mat Corporation*.

Hereby enters this disclaimer to all the claims of said patent.

[*Official Gazette December 9, 1969.*]